US012668286B2

(12) United States Patent
Lagors et al.

(10) Patent No.: US 12,668,286 B2
(45) Date of Patent: *Jun. 30, 2026

(54) BRAKING SYSTEM FOR A VEHICLE

(71) Applicant: WABTEC Hauts-de-France, Amiens (FR)

(72) Inventors: Frédéric Lagors, Serpaize (FR); Quentin Negrello, Villeneuve Saint Salves (FR); Guillaume Crosnier, Rosieres en Santerre (FR)

(73) Assignee: WABTEC Hauts-de-France, Amiens (FR)

( * ) Notice: Subject to any disclaimer, the term of this patent is extended or adjusted under 35 U.S.C. 154(b) by 839 days.

This patent is subject to a terminal disclaimer.

(21) Appl. No.: 17/975,129

(22) Filed: Oct. 27, 2022

(65) Prior Publication Data

US 2023/0048208 A1 Feb. 16, 2023

Related U.S. Application Data

(63) Continuation of application No. 16/771,891, filed as application No. PCT/FR2018/053180 on Dec. 11, 2018, now Pat. No. 11,565,729.

(30) Foreign Application Priority Data

Dec. 15, 2017 (FR) ...................................... 1762249

(51) Int. Cl.
*B61H 5/00* (2006.01)
*B60T 8/17* (2006.01)
(Continued)

(52) U.S. Cl.
CPC .............. *B61H 5/00* (2013.01); *B60T 8/1705* (2013.01); *B60T 13/686* (2013.01);
(Continued)

(58) Field of Classification Search
None
See application file for complete search history.

(56) References Cited

U.S. PATENT DOCUMENTS 806,108 A * 12/1905 Clark .................... B60T 11/228
303/73
3,753,599 A * 8/1973 Michellone ........... B60T 8/5087
137/505.22

FOREIGN PATENT DOCUMENTS

CN 101020457 A 8/2007
CN 101885327 A 11/2010
(Continued)

OTHER PUBLICATIONS

JP-4559822-B2: English Machine Translation (Year: 2010).*

*Primary Examiner* — Melanie Torres Williams
(74) *Attorney, Agent, or Firm* — K&L Gates LLP

(57) ABSTRACT

A braking system for a vehicle may include a regulating device disposed between a braking device and a pressure agent source that causes the braking device to move. The regulating device may include a slide having an internal chamber with a supply port, a venting port, and a regulating port opening into the internal chamber and through which a pressure agent from the pressure agent source may flow. The regulating port can be located between the supply port and the venting port. Each of the supply port and the venting port may have a general cross-section for passage of the pressure agent substantially having a shape with at least one apex.

23 Claims, 9 Drawing Sheets

(51) Int. Cl.

| | | |
|---|---|---|
| *B60T 13/68* | (2006.01) | |
| *B60T 15/02* | (2006.01) | |
| *B61H 13/20* | (2006.01) | |
| *F16K 11/07* | (2006.01) | |
| *F16K 31/06* | (2006.01) | |

(52) U.S. Cl.
CPC ............ *B60T 15/022* (2013.01); *B61H 13/20* (2013.01); *F16K 11/0716* (2013.01); *F16K 31/0613* (2013.01); *F16K 31/0689* (2013.01)

(56) References Cited

FOREIGN PATENT DOCUMENTS

| | | | |
|---|---|---|---|
| CN | 102180160 | A | 9/2011 |
| CN | 104533863 | A | 4/2015 |
| CN | 105459995 | A | 4/2016 |
| EP | 2371642 | A1 | 10/2011 |
| EP | 2826683 | A1 | 1/2015 |
| FR | 3005133 | A1 | 10/2014 |
| FR | 3027270 | A1 | 4/2016 |
| JP | 4559822 | B2 * | 10/2010 |
| RU | 2625474 | C2 | 7/2017 |
| SU | 71537 | A1 | 11/1947 |
| SU | 95053 | A1 | 11/1952 |

* cited by examiner

BRAKING SYSTEM FOR A VEHICLE

CROSS-REFERENCE TO RELATED APPLICATIONS

This application is a continuation of U.S. patent application Ser. No. 16/771,891 (filed 11 Jun. 2020), which is a national phase entry of International Patent Application No. PCT/FR2018/053180 (filed 11 Dec. 2018), which claims priority to French Patent Application No. 1762249 (filed 15 Dec. 2017), the entire disclosures of which are incorporated herein by reference.

BACKGROUND

Technical Field

The subject matter described herein relates to braking for vehicles such as rail transport braking systems for rail vehicles provided with a service brake and/or a parking brake supplied by a source of pressure agent (pressurized fluid) so as to act on braking members, and a pressure regulating device for the pressure agent.

Discussion of Art

Vehicles are generally equipped with service brake and/or parking brake calipers provided with a service brake and/or parking brake cylinder. This cylinder comprises a brake piston movable under the effect of the action of one or more springs and furthermore movable under the effect of a fluid under pressure. Generally, the displacement of the brake piston under the effect of the springs leads to a braking action such as the clamping of a brake disk between two linings, or the direct pressure of a block against a vehicle wheel. On the contrary, the displacement of the braking piston under the effect of the fluid under pressure leads to an opposite action to the braking, i.e. the unclamping of the brake disk or the withdrawal of the block; and thereby enables the brake to be let off.

More specifically, this type of braking cylinder may comprise a body in which and relative to which the braking piston is movable to act on the linings or on the block via a thrust rod and a braking linkage, and a cavity formed in the body and provided to receive the springs. The brake cylinder may further comprise a pressure chamber delimited in particular by the braking piston and by the body, and which is connected by a pipe to a source of pressure agent to return the piston into a resting position in which the brake is set but not applied. In particular, according to the above operation, to set the brake, the pressure chamber is supplied with pressure agent, also called fluid under pressure, via the corresponding source so as to displace the braking piston in the body. The displacement of the braking piston towards its resting position leads to the displacement of a bearing flange against the load of the spring, which becomes compressed.

For this, rail vehicles are thus equipped with one or more reservoirs forming the source, filled with fluid maintained under pressure for example by a motor-driven pump system, and by at least one fluid pressure regulating device, which is interconnected on the pipe between the reservoir and the brake cylinder.

It may be desirable to have a system and method that differs from those that are currently available.

BRIEF DESCRIPTION

In one example, a braking system for a vehicle may include a regulating device disposed between a braking device and a pressure agent source that causes the braking device to move. The regulating device may include a slide having an internal chamber with a supply port, a venting port, and a regulating port opening into the internal chamber and through which a pressure agent from the pressure agent source may flow. The regulating port can be located between the supply port and the venting port. Each of the supply port and the venting port may have a general cross-section for passage of the pressure agent substantially having a shape with at least one apex.

In another example, a braking system for a vehicle may include a regulating device disposed between a braking device and a pressure agent source that may cause the braking device to move. The regulating device may include a regulating valve with a main cavity and a slide disposed in the main cavity. The slide may have a supply port, a venting port, and a regulating port located between the supply port and the venting port. The supply port and the venting port may each have a cross-section for passage of a pressure agent having a shape with at least one apex.

In another example, a braking system for a vehicle may include a regulating device disposed between a braking device and a source of a pressure agent that may cause the braking device to move. The regulating device may include a regulating valve in which a slide having a supply port, a venting port, and a regulating port can move. The regulating port may be located between the supply port and the venting port. The supply port and/or the venting port may have a cross-section for passage of the pressure agent having a shape with at least one apex.

BRIEF DESCRIPTION OF THE DRAWINGS

The subject matter may be understood from reading the following description of non-limiting embodiments, with reference to the attached drawings, wherein below.

3

Figures 16, 17, 18:
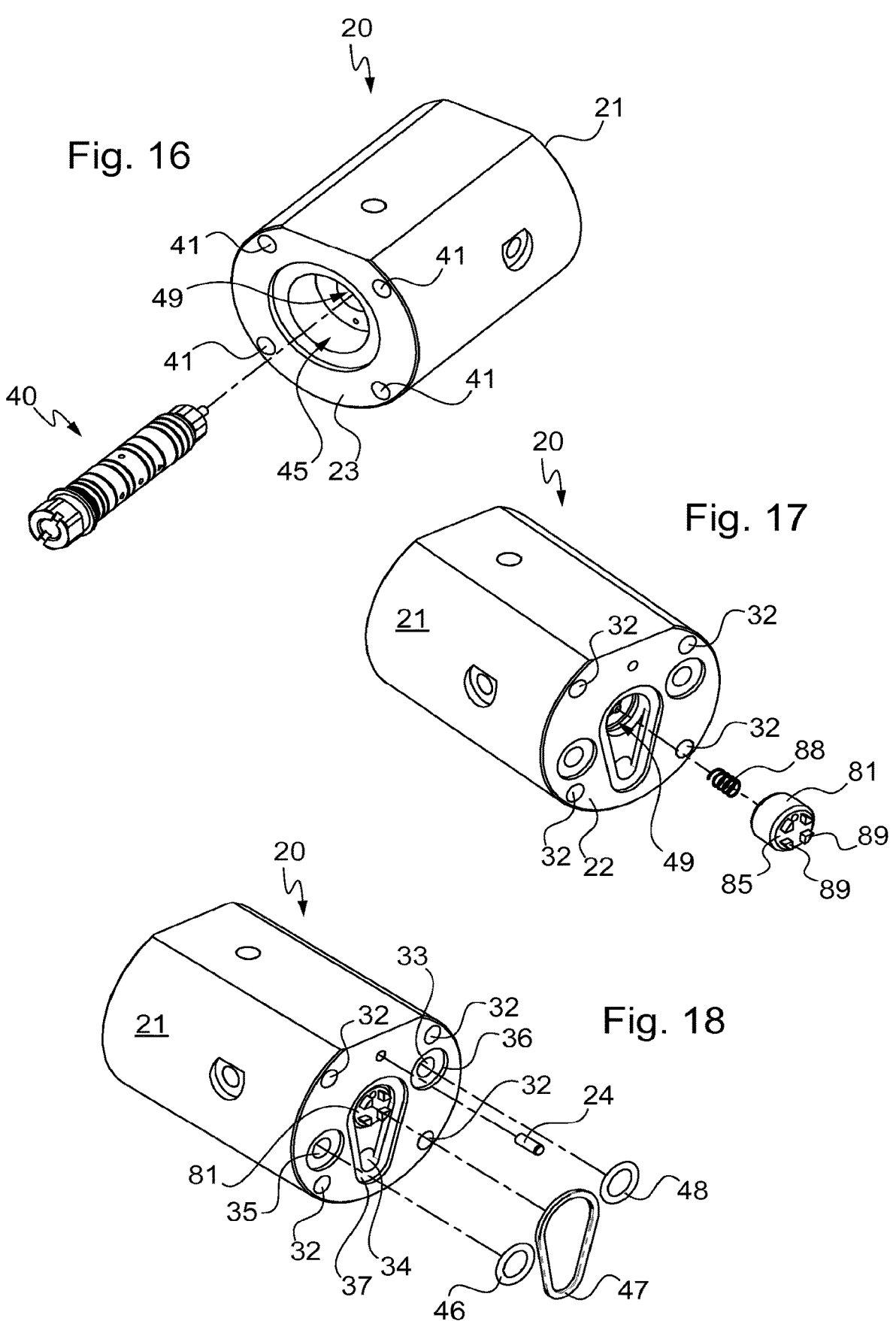
FIG. 16 illustrates the assembly of the different components of the valve in and on the valve body.

FIG. 17 also illustrates the assembly of the different components of the valve in and on the valve body; and FIG. 18 also illustrates the assembly of the different components of the valve in and on the valve body.

DETAILED DESCRIPTION

The inventive subject matter described herein concerns a braking system for a vehicle of the type described above, that is particularly simple, convenient, and economical. According to a first aspect, the inventive subject matter thus may relate to a rail transport braking system for a vehicle such as a rail vehicle and having braking members with at least one lining or at least one block. The braking system may include a braking device provided with a cylinder and a piston which may be movable relative to the cylinder to act on the braking members, a source of pressure agent that may supply the braking device with pressure agent and cause the piston to move, and a regulating device disposed between the source and the braking device and that may control the pressure value of the pressure agent passing between the regulating device and the braking device to a predetermined value.

The regulating device of the braking system may include a regulating valve provided with a body having a longitudinal main cavity and, opening into the main cavity, a supply channel, a venting channel, and a regulating channel located between the supply and venting channels. The regulating device may include a slide having an internal chamber and at least one supply port, at least one venting port and at least one regulating port (located between the supply and venting ports) opening into the internal chamber. The supply and venting ports of the slide each may have a general cross-section for passage of the pressure agent and substantially having a shape with at least one apex. The slide may be moveably mounted in the main cavity of the body between a supply position (in which the at least one supply port faces the supply channel of the body) and a venting position (in which the at least one venting port faces the venting channel of the body.

The regulating device may have a substantially stable regulating configuration in which the pressure value of the pressure agent passing between the regulating device and the braking device may be limited to the predetermined value, and in which the slide is positioned in the main cavity of the body such that the at least one regulating port faces the regulating channel of the body whereas the supply and venting ports are respectively away from the supply and venting channels of the body.

In the braking system, the pressure agent may flow in the internal chamber and in the ports of the valve slide and in the channels of the valve body. The combination of such an arrangement with supply and venting ports (of which the general cross-section for passage of the pressure agent may substantially have a shape with at least one apex) and with supply and venting ports that are closed (that is to say which do not respectively face the supply and venting channels) while the regulating port or ports are open (that is to say facing the regulating channel), makes it possible both to substantially limit leakages of pressure agent in the regulating valve and to provide particularly precise regulation with regard to a predetermined limit value for pressure agent pressure.

The precision of the regulation may be defined and appraised in particular by a satisfactory response time of the valve with regard to application to a transport braking system, and in particular by a stability of the regulation over the whole range of useful pressure, that is to say from zero (not included) to the predetermined limit value. It will be noted that such stability may be particularly advantageous for example to operate an anti-skid function of the vehicle wheels. The system may make it possible to obtain pressure regulation with particularly good performance, simply, conveniently, and economically.

The slide may have a generally cylindrical shape and may be provided with two the supply ports that open to face each other, with two the venting ports that open to face each other, and with at least two the regulating ports that open to face each other. At least the supply ports and/or the venting ports may have a substantially triangular cross-section for passage. The slide may extend generally longitudinally and may have a first well meeting the internal chamber at a first end, as well as a first obturating plug connected mechanically and in fluid-tight manner within the first well.

The first obturating plug may include an outside cavity provided at a remote opposite location from the first well and may receive a pushing finger provided to move the slide within the main cavity of the body. The slide may extend generally longitudinally and may have, at a second end, a second well meeting the internal chamber, as well as a second obturating plug connected mechanically and in fluid-tight manner within the second well.

The second obturating plug may cooperate with a damping mechanism of the slide, mounted in the main cavity of the body. The second obturating plug may include a hole provided at a remote opposite location from the second well and the damping mechanism comprises a reducing rod at least partly inserted into the hole, a damping sleeve bearing against the reducing rod, and an elastic return member interposed between the damping sleeve and the second obturating plug. The longitudinal main cavity provided in the body of the regulating valve may open on both sides of the body.

The body of the regulating valve may be provided with a supply pipe opening on a first side of the body and into the supply channel, with a venting pipe opening on a first side of the body and into the venting channel, and with a regulating pipe opening on the first side of the body and into the regulating channel.

The regulating device may include a manifold forming a fluidic interface between the regulating valve, the braking device, and the source of pressure agent. The body of the regulating valve may have a first side by which is mounted the regulating valve on the manifold and several openings are formed on the first side to enable fluidic communication between the regulating valve and the manifold. The regulating device may include an actuator that can move the slide in the main cavity of the body according to a control instruction. The body of the regulating valve may have a second side by which the regulating valve is mounted on the actuator and at least one opening is formed on the second side to enable the movement of the slide within the main cavity of the body.

The regulating device may include an electrical moving coil linear actuator, configured to receive an electrical control instruction, and provided with a pushing finger coming into contact with the slide to move the latter within the main cavity of the body. The pressure agent may be a hydraulic fluid.

According to a second aspect, the inventive subject matter also relates to a regulating device for regulating a pressure agent that may be control the pressure value of the pressure agent to a predetermined value. The regulating device may include a regulating valve provided with a body having a longitudinal main cavity and a supply channel, a venting channel, and a regulating channel (located between the supply and venting channels) that open into the main cavity. The regulating device may include a slide having an internal chamber and at least one supply port, at least one venting port, and at least one regulating port (located between the supply and venting ports) and opening into the internal chamber. The supply and venting ports of the slide each may have a general cross-section for passage of the pressure agent and substantially having a shape with at least one apex.

The slide may be moveably mounted in the main cavity of the body between a supply position (in which the at least one supply port faces the supply channel of the body) and a venting position (in which the at least one venting port faces the venting channel of the body). The regulating device may have a substantially stable regulating configuration, in which the pressure value of the pressure agent is limited to the predetermined value, and in which the slide is positioned in the main cavity of the body such that the at least one regulating port faces the regulating channel of the body whereas the supply and venting ports are respectively away from the supply and venting channels of the body.

The slide may extend generally longitudinally and may have at a first end, a first well meeting the internal chamber, as well as a first obturating plug connected mechanically and in fluid-tight manner within the first well. The first obturating plug may include an outside cavity at a remote opposite location from the first well and that may receive a pushing finger provided to move the slide within the main cavity of the body. The slide may have a second well at a second end that meets the internal chamber, as well as a second obturating plug connected mechanically and in fluid-tight manner within the second well. The second obturating plug may include a hole provided at a remote opposite location from the second well that may cooperate with a damping mechanism of the slide. The damping mechanism may be mounted in the main cavity of the body. the damping mechanism may include a reducing rod at least partly inserted into the hole, a damping sleeve bearing against the reducing rod, and an elastic return member interposed between the damping sleeve and the second obturating plug.

Figure 1:
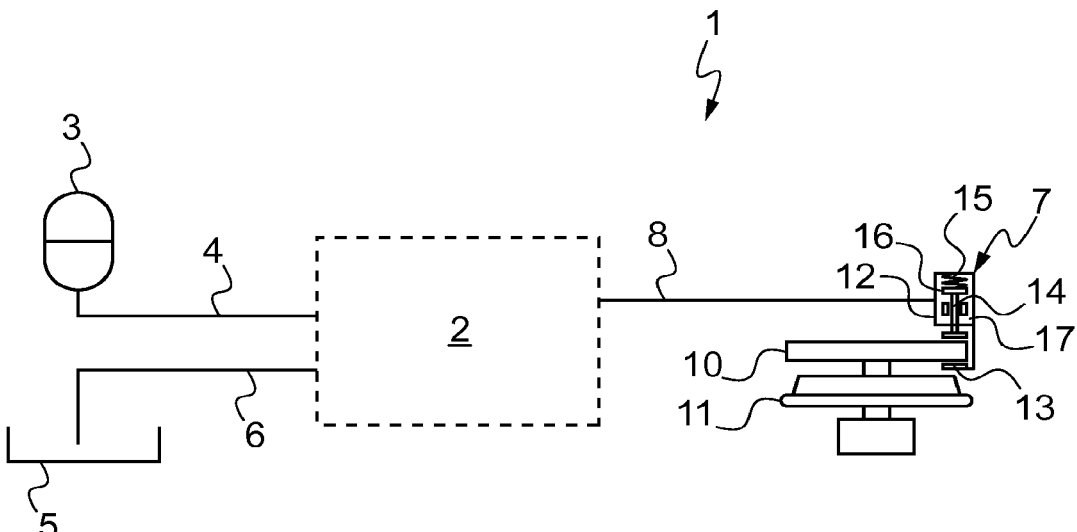
FIG. 1 is a partial diagrammatic representation of a braking system.
Figure 2:
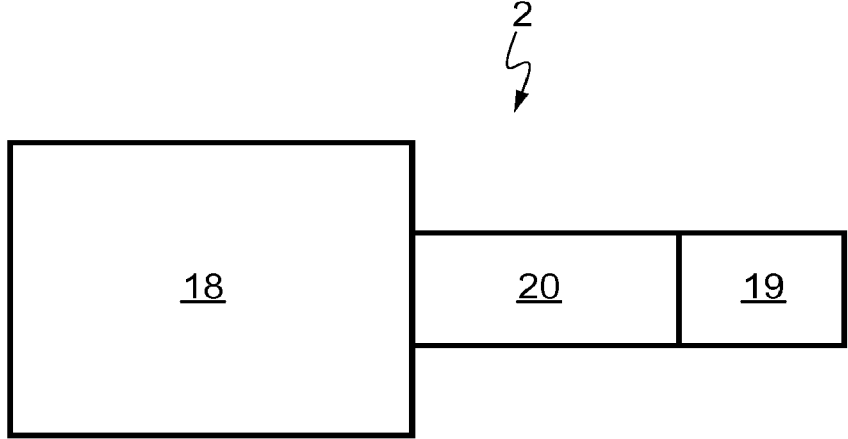
FIG. 2 is a partial diagrammatic representation of a regulating device for regulating pressure of a pressure agent of FIG. 1.
Figure 3:
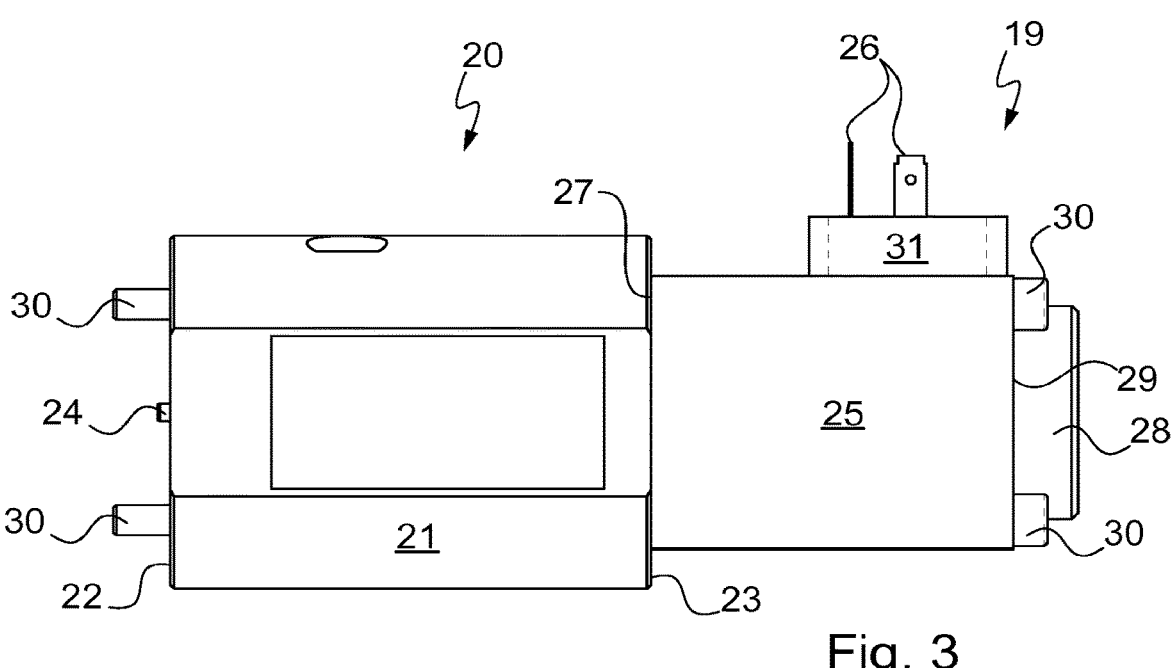
FIG. 3 illustrates a plan view of a regulating valve and an actuator.
Figure 4:
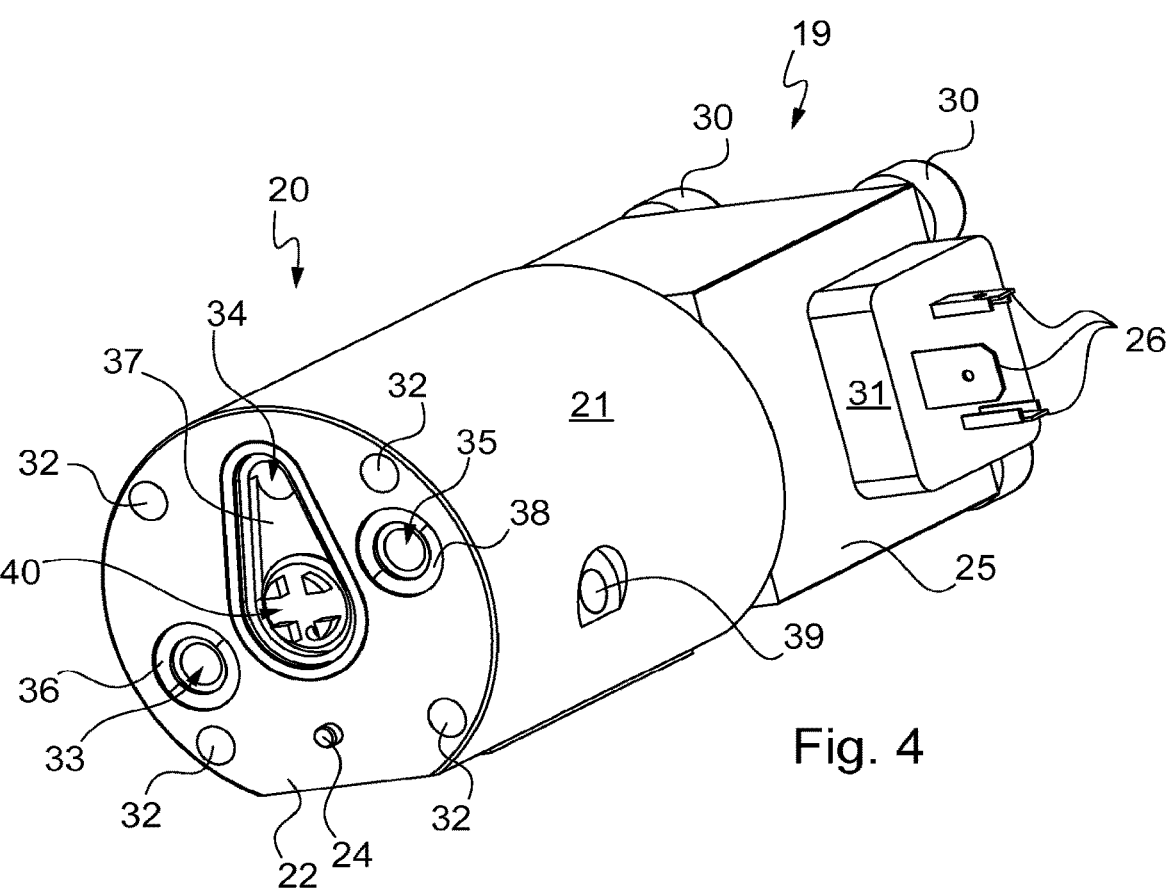
FIG. 4 illustrates a perspective view of the regulating valve and the actuator shown in FIG. 4.
Figure 5:
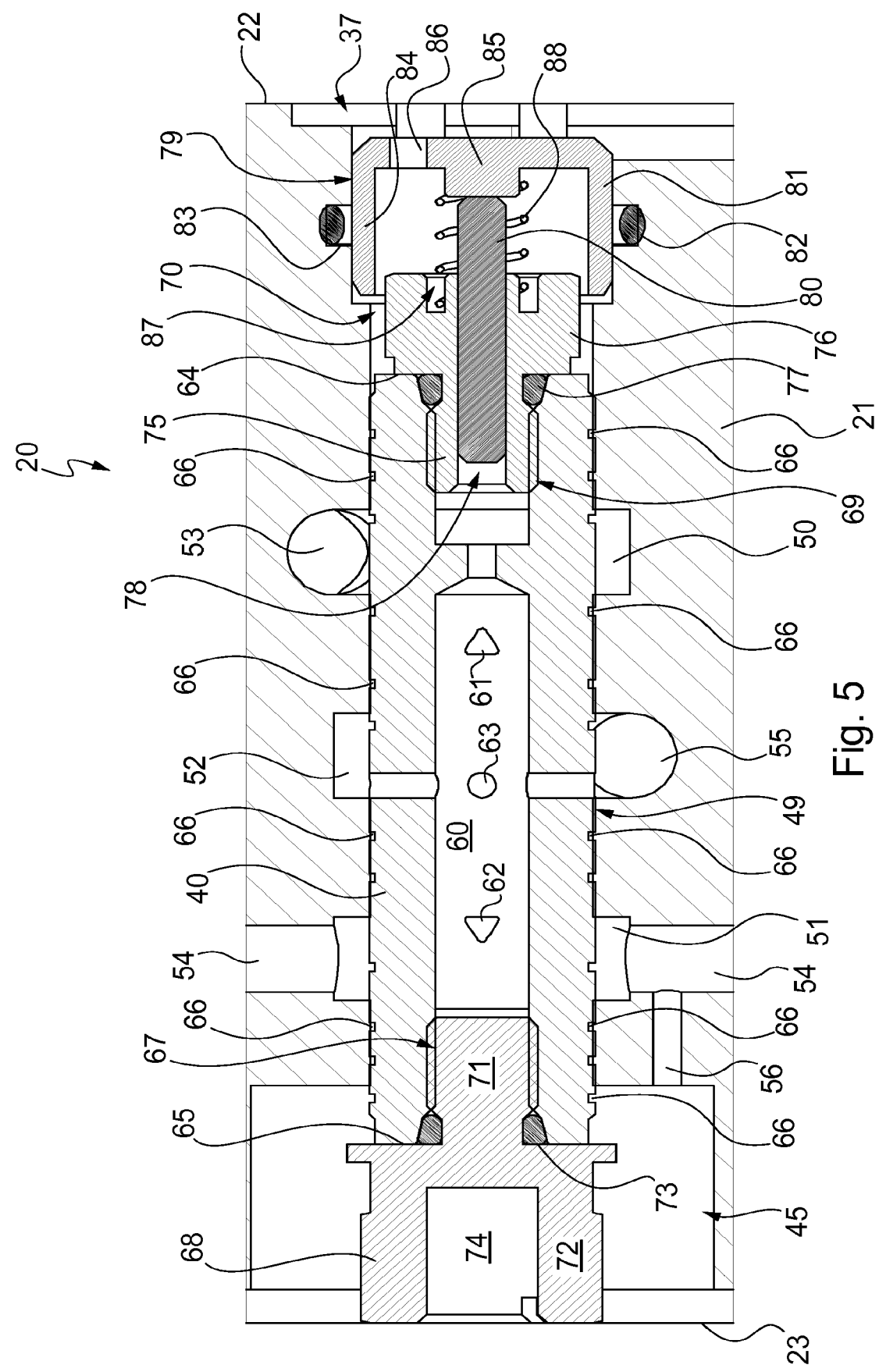
FIG. 5 is a longitudinal median cross-section view of a distribution valve without the actuator.
Figure 6:
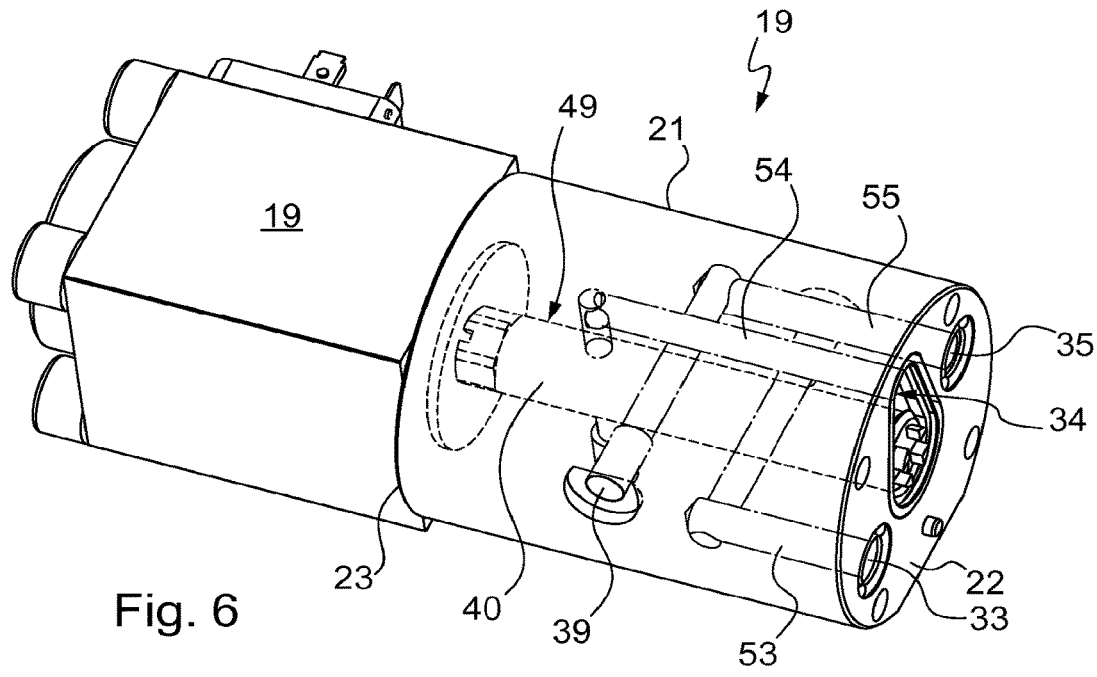
FIG. 6 illustrates the regulating valve and the actuator.
Figure 7:
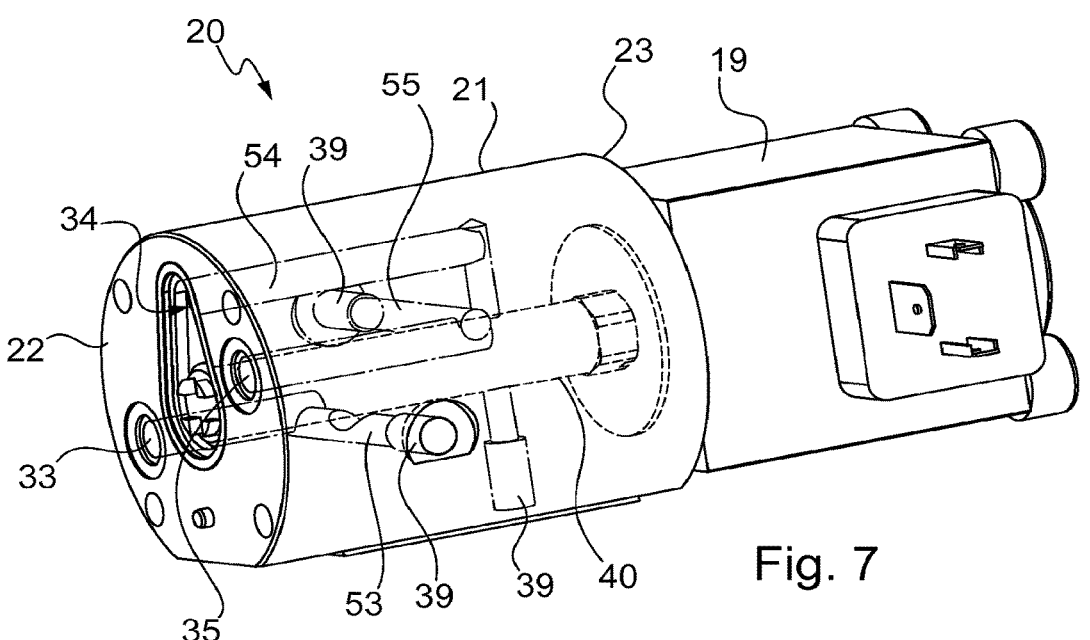
FIG. 7 illustrates the regulating valve and the actuator.
Figure 8:
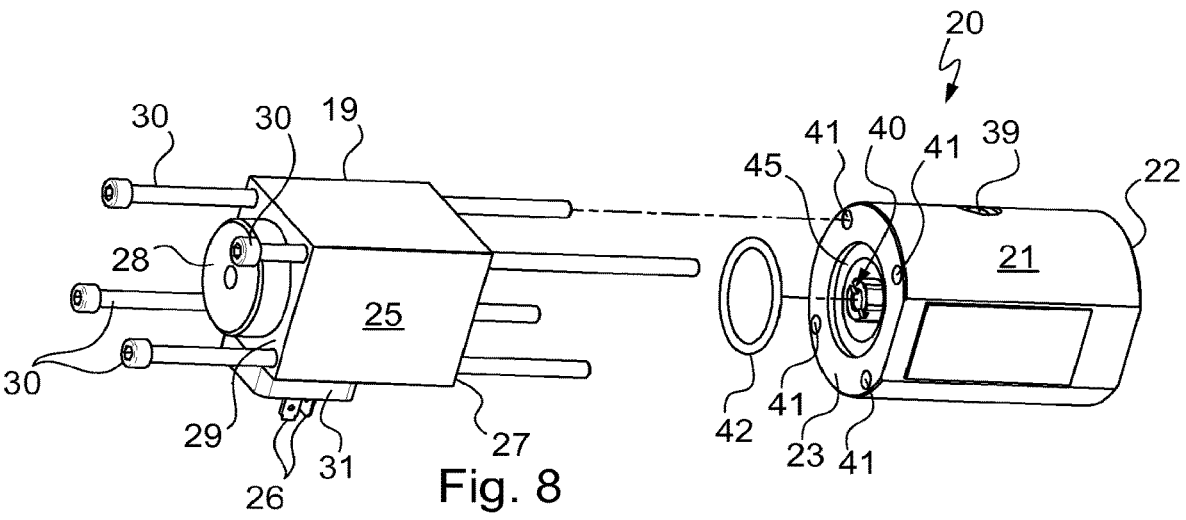
FIG. 8 is a perspective view of the regulating valve and of the actuator, taken in isolation and dismantled.
Figure 9:
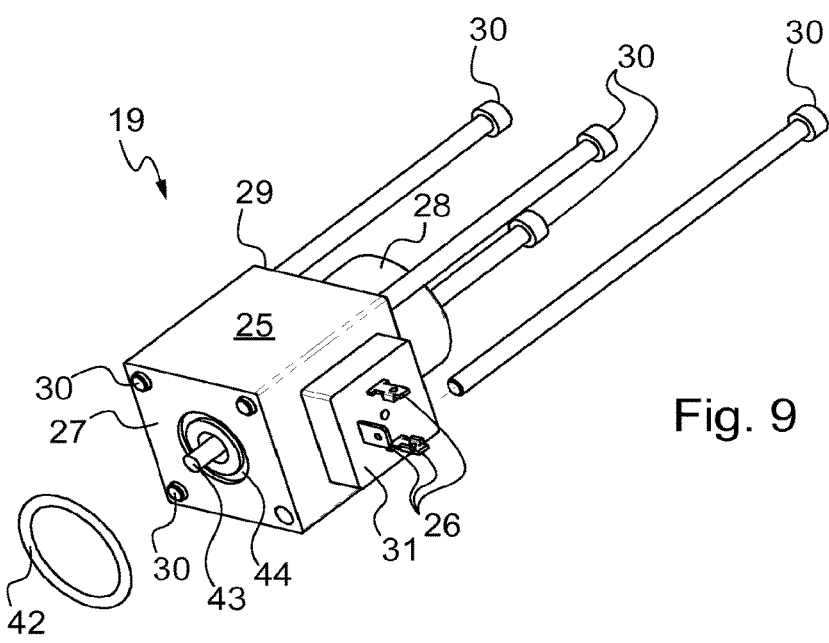
FIG. 9 is an isolated perspective view of the actuator.
Figure 10:
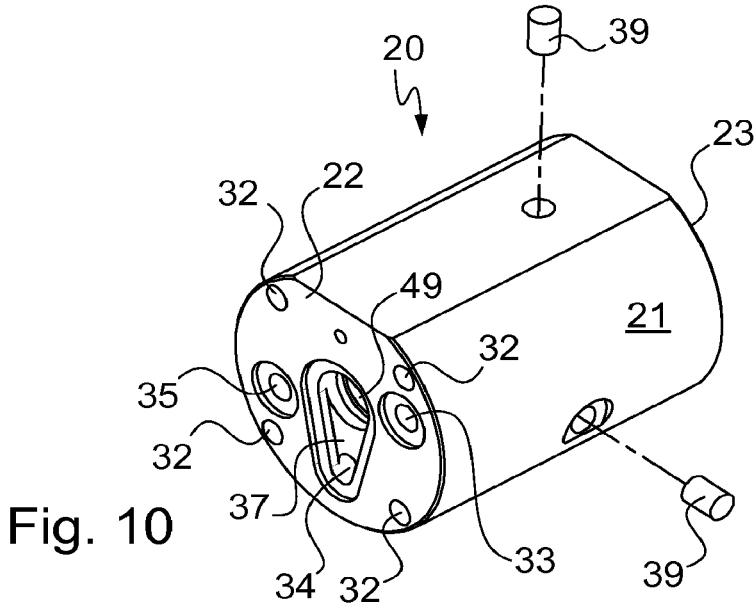
FIG. 10 illustrates a body of the regulating valve, in perspective and isolated.

FIGS. 1 and 2 are partial diagrammatic representations of a braking system 1 for a vehicle and a regulating device 2 for a pressure agent comprised by the braking system. The braking system may include a source of pressure agent, such as an accumulator 3. The source may be connected to the regulating device by a first pipe 4, a collecting tank 5 also connected to the regulating device by a second pipe 6, and a service brake caliper 7 also connected to the regulating device by a third pipe 8. The service brake caliper may be mounted here on a disk 10 associated a wheel 11 of the vehicle.

The service brake caliper may be provided with a service brake caliper body 12 forming a service brake cylinder, and braking linings 13 mechanically linked to the service brake caliper body via a braking linkage that may act on the disk. The service brake caliper may have a general form of a generally closed envelope. The service brake may include an actuator, such as a braking piston 14, accommodated in a first cavity provided in the service brake caliper body. This braking piston may be movable relative to the service brake caliper body in the first cavity and in a first axial direction.

The service brake may be provided with a spring member 15 accommodated in a second cavity provided in the service brake caliper body and with a bearing flange 16 mechanically connected both to the spring member and to the braking piston. The spring member may be formed by one or more compression springs and the bearing flange may for example have the form of a cup in which the spring member is at least partially accommodated.

The bearing flange may be mechanically connected to an end of the braking piston via a mechanical linking interface. The spring member may be provided for placing (without being acted upon externally and via the bearing flange and the interface) the braking piston in a braking position in which the braking linings apply a force on the disk to apply the brake.

Together with the service brake caliper body, the braking piston 14 may delimit a pressure chamber 17 that may be supplied by the third pipe. The supply of the pressure chamber with the pressure agent under the predetermined pressure may place the braking piston in a release position distinct from the braking position. In this release position, the linings may not apply any force on the disk and the brake may not be applied.

The pressure agent may be a hydraulic fluid that is pressurized in the accumulator at a pressure value of between approximately 110 bars and approximately 150 bars.

The braking system may include a motor-driven pump system that may keep the hydraulic fluid at a predetermined pressure value (for example, approximately 145 bars) in the accumulator. The supply of the service brake caliper with hydraulic fluid may be carried out from the accumulator via the pressure regulating device.

The regulating device, as diagrammatically illustrated in FIG. 2, may include a manifold 18, a regulating valve 20 (also referred to as a pressure reducer) mounted on the manifold, and an actuator 19 mounted on the regulating valve. The regulating device may regulate and control the pressure value of the hydraulic fluid coming from the accumulator, such as at a utilization value equal to approximately 110 bars, in particular for the hydraulic to be conveyed to the service brake caliper to reach the pressure chamber of the service brake caliper and/or from that chamber to the collecting tank.

The manifold may be formed by a body forming a fluidic interface in which in particular pipes are provided, for the fluidic interconnection of the first, second, and third pipes with the dedicated orifices of the regulator valve 20 (see below).

The regulating valve may include a valve body 21 that can have a cylindrical general shape and extend substantially longitudinally. The regulating valve also may include a regulating slide 40 inserted into the valve body. The valve body may have a first side 22 by which is mounted that regulating valve on the manifold. The regulating valve may include a fool-proofing pin 24 projecting from the first side for mounting of the pin on the manifold. The valve body may have a second side 23 opposite to the first side. The regulating valve may be mounted on the actuator 19. The valve body may have a longitudinal main cavity 49 to receive the regulating slide and which opens both on the first side and on the second side of the valve body, thus forming openings on opposite sides of the valve body. The valve body may include several openings formed on the first side to enable fluidic communication between the regulating valve and the manifold. These openings may include a supply opening 33 around which is formed a sealing channel 36 provided to receive an 'O' ring seal 48, a regulating opening 35 around which is formed a sealing channel 38 provided to receive an 'O' ring seal 46, and a venting opening 33 around which is formed a sealing chamber 37 surrounded by an 'O' ring seal 47 (the seals 46, 47 and 48 are shown in FIG. 18).

The valve body may include through-bores opening at holes 32 on the first side and holes 41 on the second side. The valve body also may be provided with a supply channel 50, with a venting channel 51, and with a regulating channel 52 located between the supply and venting channels. The supply, venting, and regulating channels may be at least partly annular here and each open into the main cavity.

The valve body may be provided with a supply pipe opening, at one end, on the first side by the supply opening and, at an opposite end, into the supply channel, with a venting pipe 54 opening, at one end, on the first side by the venting opening and, at an opposite end, into the venting channel, and with a regulating pipe 55 opening, at one end, on the first side by the regulating opening and, at an opposite end, into the regulating channel. The supply, venting, and regulating pipes may be formed in the valve body by different bores which form orifices which may be plugged here with expander plugs 39, inserted by force and in fluid-tight manner into the valve body. The valve body may include an annular channel forming a first chamber 45 provided on the second side 23, surrounded by an 'O' ring seal 42, and in which the slide may be at least partly received.

The valve body may also include a first nozzle 56 opening, at one end, into the first chamber and, at an opposite end, into the venting pipe. The regulating slide may have a generally cylindrical shape in which an internal chamber 60 may be provided. The regulating slide may include two supply ports 61, two venting ports 62, and four regulating ports 63 located between the supply and venting ports. The supply and venting ports each may have a general cross-section for passage of hydraulic fluid substantially having a shape with at least one apex. The apex of the venting ports may be generally directed toward a first end 65 of the slide. The apex of the supply ports may be generally directed toward a second end 64 of the slide, which is opposite end to the first end.

The supply and venting ports may be of triangular shape and thus each have three apexes. The regulating ports may each have a general cross-section for passage of the hydraulic fluid having a circular shape and may be circle-shaped. The supply ports may open facing each other in the internal chamber. The venting ports may open facing each other in the internal chamber. The regulating ports may open, in pairs, facing each other in the internal chamber.

The ports may radially pass through the slide and open into the internal chamber. The slide 40 may be provided, on its outside contour, with annular grooves 66 distributed over the length of the slide. The slide 40 may be mounted moveably in the main cavity of the valve body with play that is, for example, comprised between approximately six microns and approximately eight microns between the outside contour of the slide and the valve body. The regulating slide may have at a first end 65, a first well 67 meeting the internal chamber, as well as a first obturating plug 68 connected mechanically and in fluid-tight manner within the first well. The regulating slide also may have at its second end 64, a second well 69 substantially meeting the internal chamber at a remote location that is opposite the first well, as well as second obturating plug 70 connected mechanically and in fluid-tight manner within the second well. The first and second wells may each be provided with tapped walls and the first and second obturating plugs screwed into the first and second respective wells. The first obturating plug may be provided with a threaded base 71 fixedly inserted into the first well 67, with a head 72 projecting from the base and with a housing 90 provided between the head and the base and in which is housed an 'O' ring seal 73 to seal the mounting of the first obturating plug in the first well of the slide.

The first obturating plug may include an outside cavity 74 provided in the head at a remote location that is opposite from the base and from the first well. This cavity may receive a pushing finger 43 of the actuator provided to move the slide within the main cavity of the valve body. The second obturating plug may be provided with a threaded base 75 fixedly inserted into the second well, with a head 76 projecting from the base and with a housing 91 provided between the head and the base and in which is housed an 'O' ring seal 77 to seal the mounting of the second obturating plug in the second well of the slide. The second obturating plug may include a through hole 78 formed passing through the head and through the base, until the hole opens into the second well.

The slide may be provided with a damping mechanism 79 that may be mounted in the main cavity of the valve body and that may cooperate with the second obturating plug. The damping mechanism may include a reducing rod 80 at least partly inserted into the through hole. The damping mechanism may include a damping sleeve 81 forming a cap inserted substantially by force into the main cavity of the body of the regulating valve, an 'O' ring seal 82 accommodated in a channel 83 provided in the valve body and interposed between the body and a lateral wall 84 of the damping sleeve to seal the mounting of that sleeve in the valve body. The damping sleeve may include a back wall 85 from which the lateral wall may project and on which an end of the reducing rod comes to bear. The damping sleeve may include a vent 86 provided in the back wall. The damping mechanism may include an elastic return member 88 (e.g., a compression spring) interposed between the back wall of the damping sleeve and the second obturating plug.

The second obturating plug may be provided with a housing 87 provided in the base of the second obturating plug at a remote opposite location from the head 75 and from the second well 69, and which receives and partially guides the elastic return member.

The damping sleeve may include spreader studs 89 projecting from the back wall 85, at a remote opposite location from the second obturating plug.

The actuator may be an electrical moving coil linear actuator. The actuator may include a generally parallelepiped casing 25 having a first side 27 that comes to bear against the second side 23 of the valve body for assembly, as well as a second side 29, which is an opposite side to the first side. The actuator may include bores passing longitudinally through the casing and fastening screws 30 inserted into those bores from the second side 29 until the screws emerge by the first side 27. The fastening screws may have a predetermined shank length. The shanks of the screws may pass through the valve body from the second side 23, by holes 41, until the screws emerge by the first side 22, via holes 32. The fastening screws can enable the assembly of the actuator and the regulating valve to be fastened to the manifold.

The actuator may be provided with an electrical connection base 31 fastened to a main wall of the casing which extends between the first and second sides 27, 29, and electrical connection lugs 26 which project from the base. The actuator may include an electric coil mainly housed in the casing and in a protuberance 28 projecting from the casing by the second side 29. The actuator may include a pushing finger 43 mechanically connected to the coil and projecting from the casing by the first side 27. The actuator coil may receive an electrical control instruction via the connection lugs to cause the pushing finger to move the slide within the main cavity of the valve body.

The actuator may include an annular channel forming a second chamber 44 provided on the first side of the casing to enable movement of the pushing finger. The actuator and the regulating valve may be arranged relative to each other such that the second annular chamber is located facing the first annular chamber of the valve body. The seal 42 may be situated at the interface between the first and second chambers.

Figure 11:
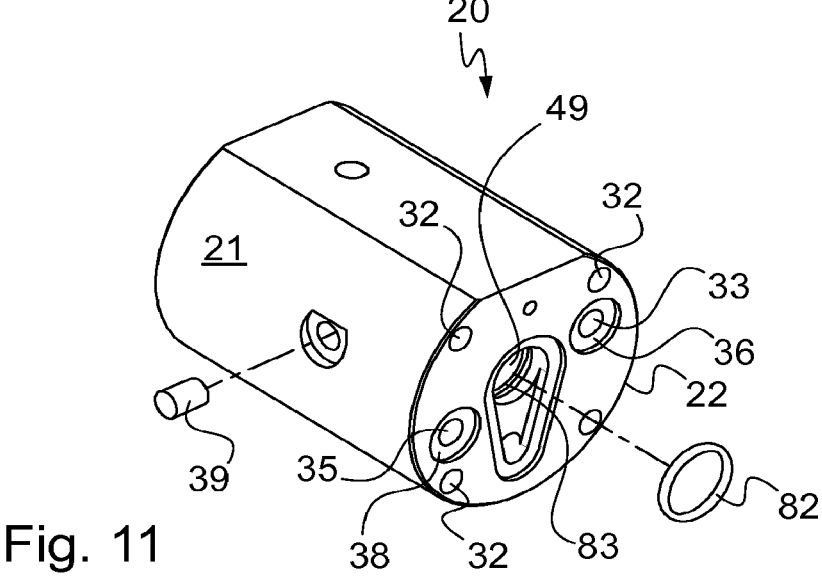
FIG. 11 also illustrates the body of the regulating valve, in perspective and isolated.
Figures 12, 13:
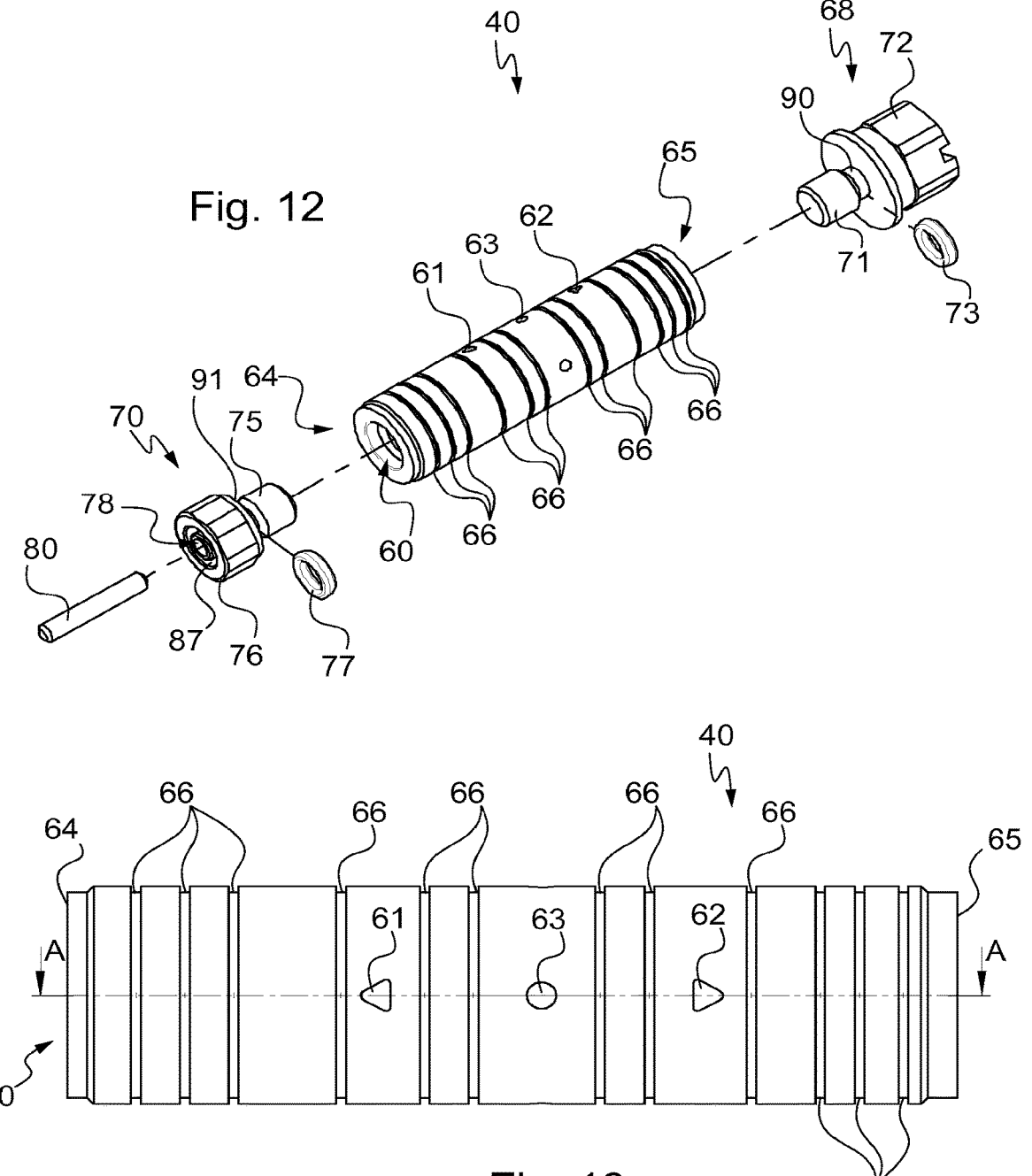
FIG. 12 is an exploded representation in perspective of different components of the valve.
FIG. 13 illustrates a plan view of a regulating slide.
Figures 14, 15:
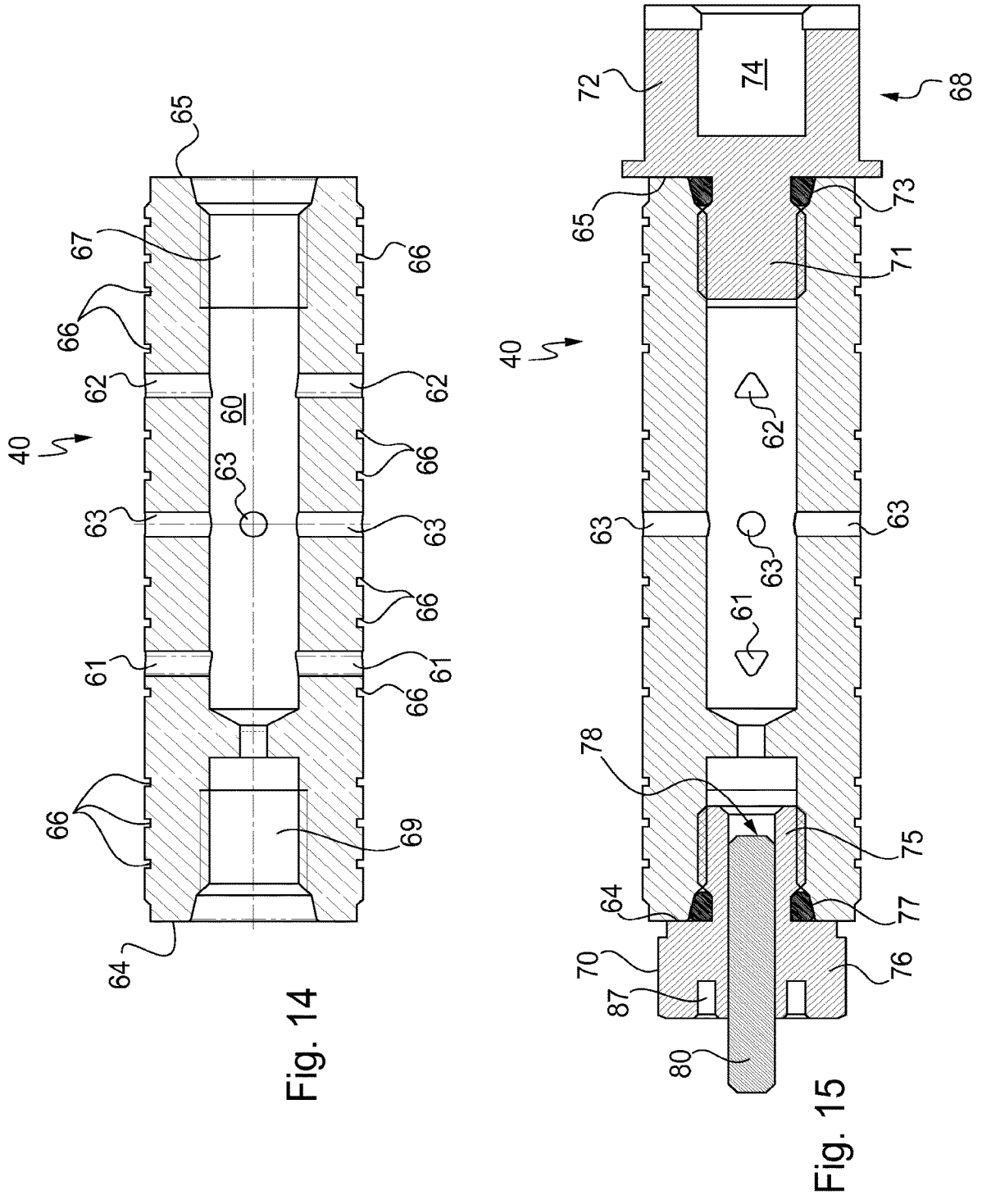
FIG. 14 illustrates a section view of the regulating slide on line A-A of FIG. 13.
FIG. 15 illustrates the different components visible in FIG. 12 in an assembled state and in medial longitudinal section.

The seal 73 may be mounted in the housing between the head and the base of the first obturating plug. The base may be inserted and screwed into the first well adjacent the first end of the slide. The seal 77 may be mounted in the housing between the head and the base of the second obturating plug. The reducing rod may be inserted through the through hole provided in the second obturating plug. The base 75 may be inserted and screwed into the second well adjacent the second end of the slide. The seal 82 may be inserted into the channel provided in the valve body by the first side 22 (as shown in FIG. 11).

The slide may be inserted into the main cavity 49 of the valve body, by entering through an opening formed on the second side 23 of the valve body. The elastic member may be mounted, by the first side of the valve body, on the reducing rod and partially housed in the housing in the base of the second obturating plug at a remote opposite location from the head 75.

The damping sleeve may be mounted, by the first side of the body valve, in the main cavity and substantially around the reducing rod and the elastic member until the back wall 85 comes to bear on the end of the reducing rod. The damping sleeve may be held in place in the main cavity by action of the seal 82.

The pin 24 may be mounted on the first side of the valve body. The 'O' ring seals 46 and 48 may be housed in respective sealing channels 38 and 36 formed respectively around regulating and supply openings 35 and 33. The 'O' ring seal 47 may be housed around the sealing chamber 37 formed around the venting opening 34. The regulating valve may be assembled in this way and the actuator may be mounted on the second side of the valve body. The second annular chamber of the casing of the actuator may face the first annular chamber of the valve body. The seal 42 may be sandwiched between the valve body and the casing at the interface between the first and second chambers. The pushing finger may be received in the outside cavity of the first obturating plug.

The regulating valve and the actuator may thereby be assembled and may be mounted on the manifold by the first side of the valve body. The fastening screws may be installed in the bores passing through the casing of the actuator and of the valve body and mechanically connected to the manifold to form a regulating device 2 assembled and mounted in the braking system shown in FIG. 1. The arrangement described above may enable the slide to be mounted moveably within the main cavity of the valve body 21 between a supply position (in which the supply ports face the supply channel of the valve body 20) and a venting position (in which the venting ports face the venting channel of the valve body). The slide may be moved with the first and second obturating plugs; whereas the slide may be movable relative to the damping mechanism formed by the reducing rod, the elastic member, and the sleeve.

The arrangement may make it possible to provide a regulating device that may have a substantially stable regulating configuration in which the pressure value of the hydraulic fluid passing between the regulating valve and the pressure chamber delimited by the piston and the body of the brake caliper is controlled to the predetermined value.

In this configuration, the slide may be positioned in the main cavity of the body valve such that the regulating ports face the regulating channel of the valve body while the supply and venting ports are at a distance (and thus do not face) the supply and venting channels of the body. In the braking system, the hydraulic fluid may flow within the internal chamber and within the ports 61, 62, 63 of the slide of the regulating valve and also in the channels 50, 51, 52 of the valve body.

The combination of the arrangement with the supply and venting ports (of which the general cross-section for passage of the fluid is triangular) and with the supply and venting ports that are closed (e.g., which do not respectively face the supply and venting channels) when the regulating ports are open (e.g., facing the regulating channel), may make it possible both to substantially limit any leakages of the hydraulic fluid in the regulating valve and to provide particularly precise regulation with regard to a predetermined limit value for hydraulic fluid pressure.

The precision of the regulation may be defined and appraised in particular by a satisfactory response time of the regulating valve with regard to application to the braking system, and in particular by a stability of the regulation over the whole range of useful pressure (e.g., from zero (not included) to the predetermined limit value). This may make it possible to offer the advantage of maintaining a hydraulic fluid pressure between approximately 110 bars and approximately 145 bars in the accumulator for a longer time and thus rely on the motorized pump system less. Such stability may be particularly advantageous to operate an anti-skid function of the vehicle wheels, for example.

In the example embodiment described above of the braking system and the service brake caliper, when the vehicle requires to be braked or stopped, the service brake may be applied via the spring member 15. It may be required to reduce the pressure in the pressure chamber or even to vent the hydraulic fluid (e.g., zero pressure). The actuator may receive a determined control instruction and the pushing finger may move the slide within the valve body such that the venting ports come to face the venting channel. The hydraulic fluid may pass from the caliper by the pipe 8, between the regulating valve by the regulating opening 35, passes within the regulating pipe 55, within the regulating channel 52, within the regulating ports 63, within the internal chamber 60, then within the venting ports 62, within the venting channel 51, within the venting pipe 54 until the fluid enters the sealing chamber 37 at the location of the venting opening 34 before flowing to reach the collection tank via the pipe 6.

The triangle shape of the venting ports 62 may make it possible to reduce the pressure of the fluid in quite a linear and therefore stable way. In particular, the fluidic communication between the ports 62 and the channel 51 may be made by virtue of a changing cross-section. When the hydraulic fluid pressure is attained in the caliper, the actuator may move the slide into the substantially stable configuration in which the regulating ports 63 face the regulating channel 52 of the valve body and the supply and venting ports 61 and 62 are respectively at a distance from (and therefore do not face) the supply and venting channels 50 and 51 of the valve body. On the contrary, in the example embodiment described above of the braking system and in particular of the service brake caliper, when the vehicle requires to be accelerated after an instance of braking, the spring member 15 may be unapplied. In this case, it may be required to increase the pressure in the pressure chamber. The actuator may receive a determined control instruction and the pushing finger may move the slide within the valve body such that the supply ports 61 come to face the supply channel 50. The hydraulic fluid may pass from the source via the pipe 4, between the regulating valve by the supply opening 33, passes within the supply pipe 53, within the supply channel 50, within the supply ports 61, within the internal chamber 60, then within the regulating ports 63, within the regulating channel 52, within the regulating pipe 55 until the fluid exits by the regulating opening 35 before supplying the pressure chamber of the caliper 7 via the pipe 8. The triangle shape of the supply ports 61 may make it possible to raise the pressure of the fluid in a linear and stable way. In particular, the fluidic communication between the ports 61 and the channel 52 may be made by virtue of a changing cross-section. When the hydraulic fluid pressure is attained in the caliper, the actuator may move the slide into the substantially stable configuration in which the regulating ports 63 face the regulating channel 52 of the valve body while the supply and venting ports 61 and 62 are respectively at a distance from (and therefore do not face) the supply and venting channels 50 and 51 of the valve body.

In another variant, the brake caliper may function in the opposite way to the description given above. In particular, the brake can be applied by the action of the piston via the filling of the pressure chamber with pressurized fluid at the predetermined limit pressure value. The brake can be unapplied by the action of the elastic member and thus by reducing the pressure of the fluid in the pressure chamber. The regulating device may be used according to such operation of the braking device.

In another variant, the supply ports and/or the venting ports may not be formed by a single aperture of triangular shape but rather by orifices that are triangular, circular, or rectangular, with the general cross-section for passage which the ports delimit having at least one apex as described above.

The regulating ports may also have a general cross-section for passage having a shape substantially having at least one apex.

The slide may have more or fewer supply and/or regulating and/or venting ports. The slide may have no damping mechanism, but instead may include an obturating plug without a through hole. The slide may have no annular groove. The valve body may have no lateral groove forming an annular chamber. Only the actuator may have such a chamber. Conversely, the actuator may have no such chamber, and only the valve body may have a lateral groove forming an annular chamber. The supply, venting, and regulating openings and pipes may have a different arrangement to that described above. For example, the openings may be open partly or wholly on the periphery of the body rather than the first side of the body. The sleeve and the main cavity of the valve body may not be cylindrical but instead may be rectangular or hexagonal. The actuator may not be electrical but instead may be mechanical, hydraulic, or pneumatic. The fluid may not be hydraulic but instead may be gaseous.

It should be noted more generally that the invention is not limited to the examples described and represented.

12

What is claimed is:

1. A braking system for a vehicle, the braking system comprising:
a regulating device disposed between a braking device and a pressure agent source that causes the braking device to move,
the regulating device including a slide having an internal chamber with a supply port, a venting port, and a regulating port opening into the internal chamber and through which a pressure agent from the pressure agent source flows, the regulating port located between the supply port and the venting port, the supply port and the venting port each having a general cross-section for passage of the pressure agent substantially having a shape with at least one apex.

2. The braking system of claim 1, wherein the regulating device includes a regulating valve having a main cavity in which the slide is configured to move.

3. The braking system of claim 2, wherein the regulating valve includes a supply channel, a venting channel, and a regulating channel between the supply channel and the venting channel.

4. The braking system of claim 3, wherein the slide is configured to move in the main cavity of the regulating valve between a supply position and a venting position.

5. The braking system of claim 4, wherein the supply port of the slide faces the supply channel of the regulating valve while the slide is in the supply position, and the venting port of the slide faces the venting channel of the regulating valve while the slide is in the venting position.

6. The braking system of claim 2, wherein the main cavity in the regulating valve is open on opposite sides of the regulating valve.

7. The braking system of claim 2, wherein the regulating device includes an actuator configured to move the slide in the main cavity of the regulating valve according to a control instruction.

8. The braking system of claim 2, wherein the regulating device includes an electrical actuator having a pushing finger configured to move the slide within the main cavity of the regulating valve.

9. The braking system of claim 1, wherein the regulating device is configured to have a substantially stable regulating configuration in which a pressure value of the pressure agent passing between the regulating device and the braking device is limited to a predetermined value.

10. The braking system of claim 1, wherein the shape of the cross-section of each of the supply port and the venting port is substantially triangular.

11. A braking system for a vehicle, the braking system comprising:
a regulating device disposed between a braking device and a pressure agent source that causes the braking device to move,
the regulating device including a regulating valve with a main cavity and a slide disposed in the main cavity, the slide having a supply port, a venting port, and a regulating port located between the supply port and the venting port, the supply port and the venting port each having a cross-section for passage of a pressure agent having a shape with at least one apex.

12. The braking system of claim 11, wherein the slide is configured to move in the main cavity of the regulating valve.

13. The braking system of claim 11, wherein the regulating valve includes a supply channel, a venting channel, and a regulating channel between the supply channel and the venting channel.

14. The braking system of claim 13, wherein the slide is configured to move in the main cavity of the regulating valve between a supply position and a venting position.

15. The braking system of claim 14, wherein the supply port of the slide faces the supply channel of the regulating valve while the slide is in the supply position, and the venting port of the slide faces the venting channel of the regulating valve while the slide is in the venting position.

16. The braking system of claim 11, wherein the main cavity in the regulating valve is open on opposite sides of the regulating valve.

17. The braking system of claim 11, wherein the regulating device includes an actuator configured to move the slide in the main cavity of the regulating valve according to a control instruction.

18. The braking system of claim 11, wherein the regulating device includes an electrical actuator having a pushing finger configured to move the slide within the main cavity of the regulating valve.

19. The braking system of claim 11, wherein the regulating device is configured to have a substantially stable regulating configuration in which a pressure value of the pressure agent passing between the regulating device and the braking device is limited to a predetermined value.

20. The braking system of claim 11, wherein the shape of the cross-section of each of the supply port and the venting port is substantially triangular.

21. A braking system for a vehicle, the braking system comprising:

a regulating device disposed between a braking device and a source of a pressure agent that causes the braking device to move, the regulating device including a regulating valve in which a slide having a supply port, a venting port, and a regulating port moves, the regulating port located between the supply port and the venting port, one or more of the supply port or the venting port having a cross-section for passage of the pressure agent having a shape with at least one apex.

22. The braking system of claim 21, wherein the regulating valve includes a supply channel, a venting channel, and a regulating channel between the supply channel and the venting channel, the slide configured to move in a main cavity of the regulating valve between a supply position and a venting position, the supply port of the slide facing the supply channel of the regulating valve while the slide is in the supply position, the venting port of the slide facing the venting channel of the regulating valve while the slide is in the venting position.

23. The braking system of claim 21, wherein the shape of the cross-section of each of said one or more of the supply port or the venting port is substantially triangular.

* * * * *